(12) United States Patent
Kaneko

(10) Patent No.: US 11,218,602 B2
(45) Date of Patent: Jan. 4, 2022

(54) IMAGE PROCESSING APPARATUS AND IMAGE PROCESSING SYSTEM FOR OBTAINING PHYSICAL INFORMATION FROM WEARABLE TERMINAL

(71) Applicant: FUJIFILM Business Innovation Corp., Tokyo (JP)

(72) Inventor: Yoshifumi Kaneko, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 213 days.

(21) Appl. No.: 16/352,860

(22) Filed: Mar. 14, 2019

(65) Prior Publication Data

US 2019/0297196 A1     Sep. 26, 2019

(30) Foreign Application Priority Data

Mar. 22, 2018   (JP) .............................. JP2018-053956

(51) Int. Cl.
*H04N 1/00* (2006.01)
*G06F 3/12* (2006.01)

(52) U.S. Cl.
CPC ....... *H04N 1/00167* (2013.01); *G06F 3/1237* (2013.01); *H04N 1/00148* (2013.01); *H04N 1/00209* (2013.01)

(58) Field of Classification Search
CPC ..... G06F 3/1222; G06F 3/1238; G06F 3/1285
See application file for complete search history.

(56) References Cited

U.S. PATENT DOCUMENTS

| 9,986,131 | B2 | 5/2018 | Tanaka et al. |
| 2012/0243038 | A1* | 9/2012 | Saeda ................... G06F 3/1267 |
| | | | 358/1.15 |
| 2017/0171430 | A1* | 6/2017 | Tanaka ............... H04N 1/00307 |
| 2017/0228624 | A1* | 8/2017 | Nakayama ............ G06F 3/1231 |
| 2017/0279994 | A1* | 9/2017 | Oshima ............. H04N 1/00875 |
| 2017/0280018 | A1* | 9/2017 | Morita .................... G06F 1/163 |
| 2019/0089866 | A1* | 3/2019 | Horishita ............... H04N 1/442 |

FOREIGN PATENT DOCUMENTS

| JP | 2016149003 | 8/2016 |
| JP | 2017108316 | 6/2017 |

* cited by examiner

*Primary Examiner* — Benjamin O Dulaney
(74) *Attorney, Agent, or Firm* — JCIPRNET

(57) ABSTRACT

An image processing apparatus includes: a storage unit that stores additional processing information which is processing information associated with physical information of a physical information terminal which a user wears, the additional processing information being transmitted from a user terminal that generates the processing information according to an instruction from the user; a first receiving unit that receives the physical information from the physical information terminal; and an execution unit, in a case where the physical information received by the first receiving unit matches the physical information of the additional processing information stored in the storage unit, executes a process corresponding to the processing information included in the additional processing information.

20 Claims, 3 Drawing Sheets

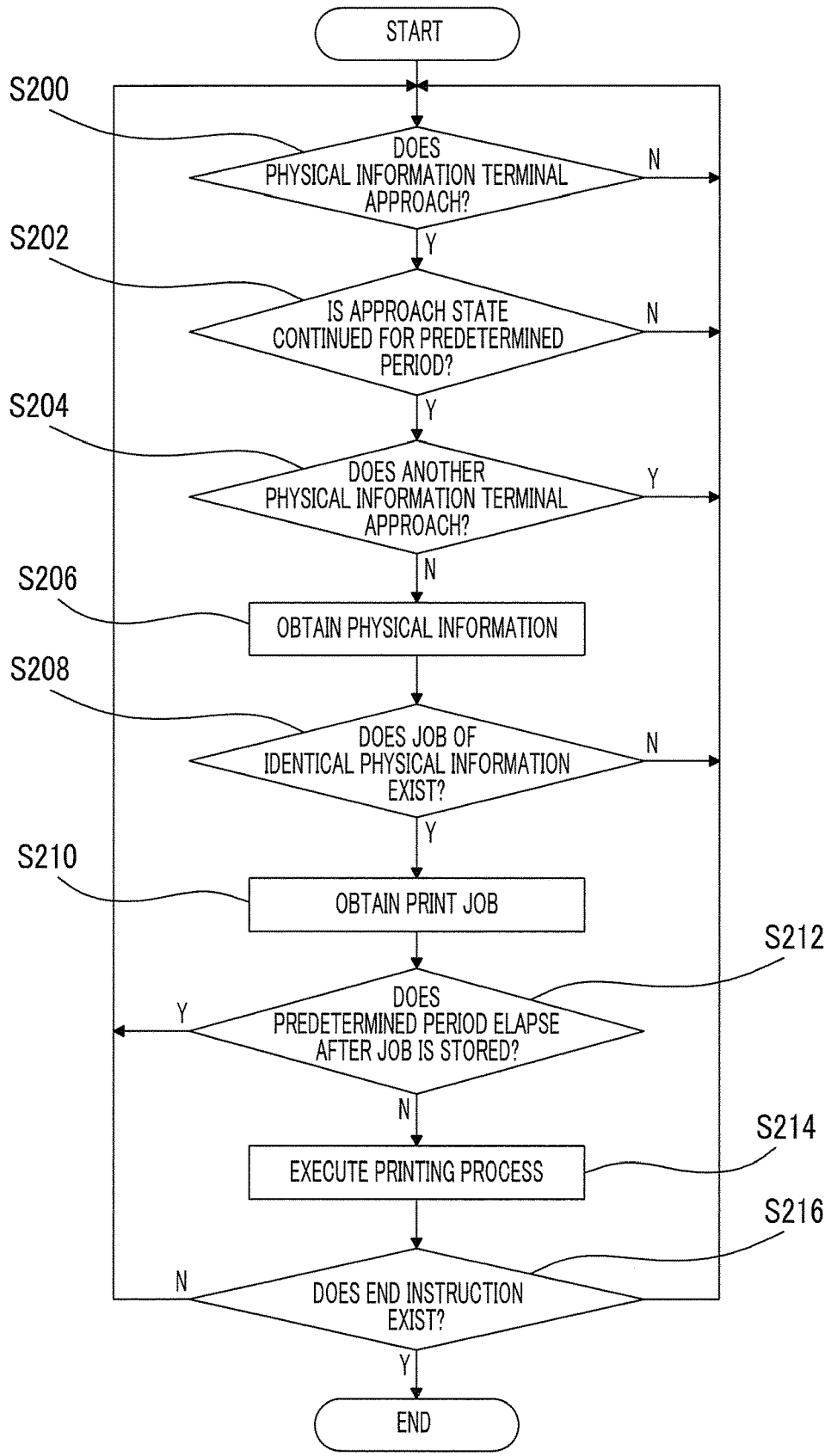

IMAGE PROCESSING APPARATUS AND IMAGE PROCESSING SYSTEM FOR OBTAINING PHYSICAL INFORMATION FROM WEARABLE TERMINAL

CROSS-REFERENCE TO RELATED APPLICATIONS

This application is based on and claims priority under 35 USC 119 from Japanese Patent Application No. 2018-053956 filed Mar. 22, 2018.

BACKGROUND

(i) Technical Field

The present invention relates to an image processing apparatus and an image processing system.

(ii) Related Art

JP2016-149003A discloses an information processing apparatus capable of communicating with a user terminal. The information processing apparatus includes a receiving section which receives bio-information which the user terminal obtains from the user carrying the user terminal, from the user terminal, a user authentication processing section which executes a user authentication process of the user carrying the user terminal based on the bio-information received from the receiving section, and an information processing section which provides an information processing function based on a result of the user authentication process by the user authentication processing section.

JP2017-108316A discloses an image processing system including a terminal device which a user wears and uses and an image output device which executes an output process of outputting an image according to an instruction from the user. The terminal device includes an obtaining section which obtains physical attributes from the user. The terminal device or the image output device includes an authenticating section which executes an authentication process of authenticating the user based on the physical attributes obtained by the obtaining section before the output process is executed. The image output device includes an output processing section which executes the output process in a case where the user is authenticated by the authenticating section.

SUMMARY

Aspects of non-limiting embodiments of the present disclosure relate to an image processing apparatus and an image processing system capable of more easily performing a confidential process as compared with using an authentication system.

Aspects of certain non-limiting embodiments of the present disclosure overcome the above disadvantages and other disadvantages not described above. However, aspects of the non-limiting embodiments are not required to overcome the disadvantages described above, and aspects of the non-limiting embodiments of the present disclosure may not overcome any of the problems described above.

According to an aspect of the present disclosure, there is provided an image processing apparatus including: a storage unit that stores additional processing information which is processing information associated with physical information of a physical information terminal which a user wears, the additional processing information being transmitted from a user terminal that generates the processing information according to an instruction from the user; a first receiving unit that receives the physical information from the physical information terminal; and an execution unit, in a case where the physical information received by the first receiving unit matches the physical information of the additional processing information stored in the storage unit, executes a process corresponding to the processing information included in the additional processing information.

BRIEF DESCRIPTION OF THE DRAWINGS

Exemplary embodiment(s) of the present invention will be described in detail based on the following figures, wherein:

FIG. 3 is a flowchart illustrating a flow of an additional processing information executing process in the image processing apparatus according to the exemplary embodiment.

DETAILED DESCRIPTION

Hereinafter, exemplary embodiments of the present invention will be described in detail with reference to the accompanying drawings.

An image processing apparatus and an image processing system according to the present exemplary embodiment will be described with reference to FIGS. 1 to 3.

Figure 1:
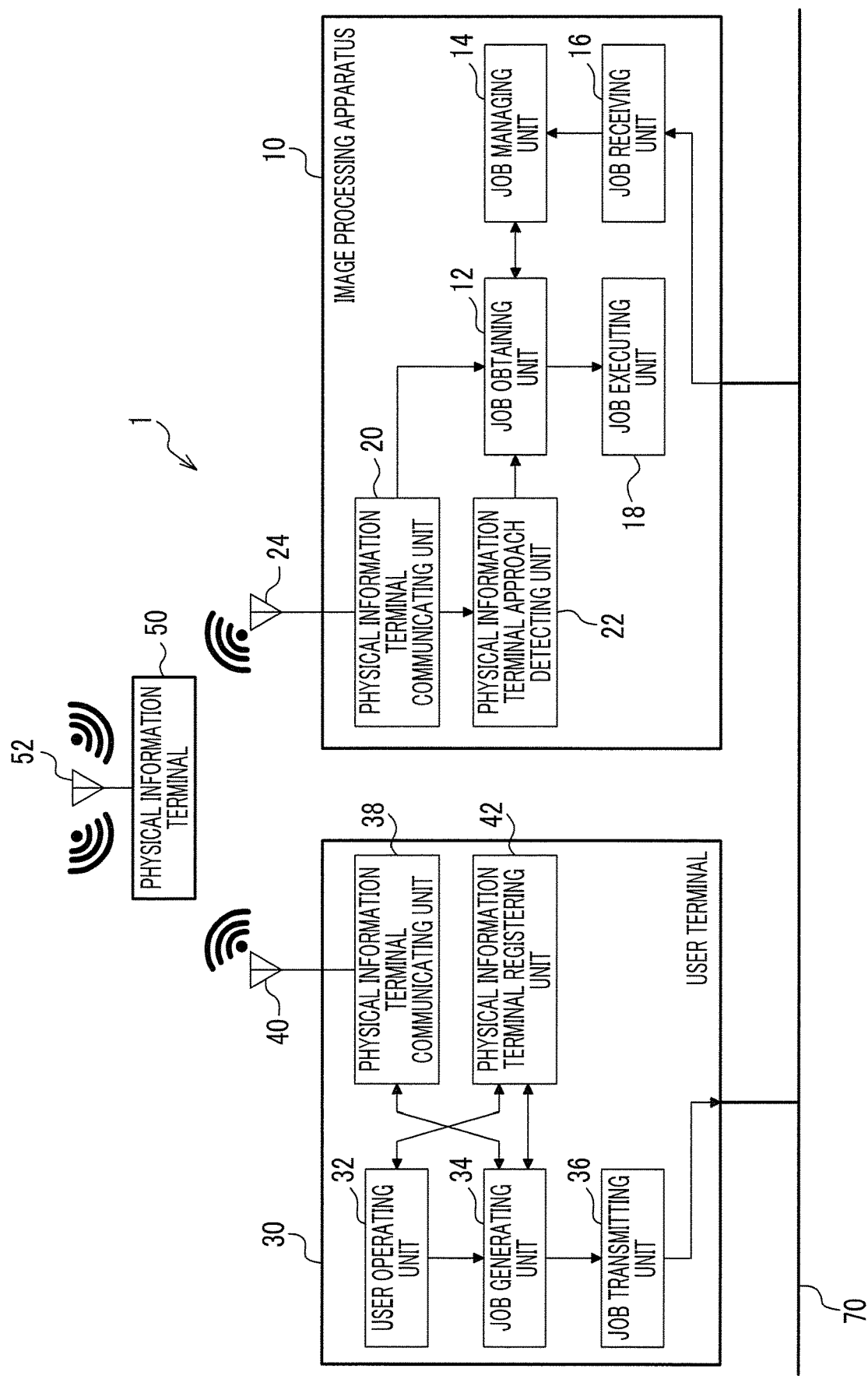
FIG. 1 is a block diagram illustrating a configuration of an image processing apparatus and an image processing system according to an exemplary embodiment.
Figure 2:
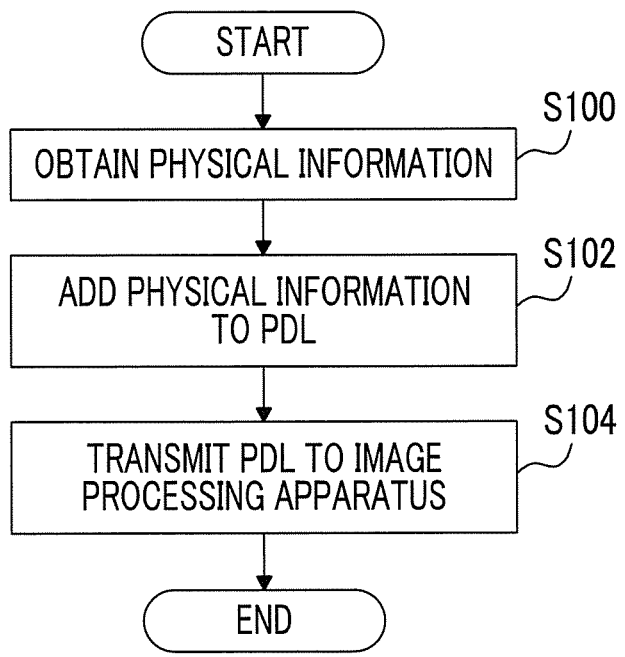
FIG. 2 is a flowchart illustrating a flow of an additional processing information generating process in a user terminal according to the exemplary embodiment.

FIG. 1 illustrates an example of a configuration of an image processing system 1 according to the present exemplary embodiment. As illustrated in FIG. 1, the image processing system 1 is configured to include an image processing apparatus 10, a user terminal 30, and a physical information terminal 50. The image processing apparatus 10 is an image processing apparatus according to the present exemplary embodiment. The image processing apparatus 10 and the user terminal 30 are connected with each other via a network 70. FIG. 1 illustrates a state in which one image processing apparatus 10 and one user terminal 30 are connected to the network 70, but the exemplary embodiment is not limited thereto. Each of the image processing apparatus 10 and the user terminal 30 may be plural. In addition, although the aspect of the network 70 is not particularly limited thereto, as an example in the present exemplary embodiment, the network 70 is configured with a wired or wireless local area network (LAN).

The image processing apparatus 10 according to the present exemplary embodiment is an apparatus including an image processing function such as an image forming apparatus (printer), a multi-function machine integrated with a scanner function, a facsimile function, a copy function, and the like on the printer. In the present exemplary embodiment, the image forming apparatus will be described as an example.

The physical information terminal 50 is a terminal device which a user puts on (wears) and uses. Although the aspect of the physical information terminal 50 is not particularly limited thereto, an example of the physical information terminal 50 is a wearable terminal, a smart phone, an identification card (ID card), or the like. The wearable terminal is used as an example of the physical information terminal 50 according to the present exemplary embodiment. The wearable terminal is used without being limited to a clock type, a glasses type, and the like as the aspect of the wearable terminal. The physical information terminal 50 includes an antenna 52 which always or intermittently transmits a signal indicating information (hereinafter, "physical information") related to physical attributes of the user who wears the physical information terminal 50 so as to distinguish between a plurality of users. As long as "physical information" according to the present exemplary embodiment is a signal for distinguishing between the users such as iris information of the user, fingerprint information of the user, location information of the user, or the like, the physical information is not limited thereto. The location information of the user is, for example, seat location information of the user. The location information is represented as, for example, coordinates on a map. The physical information transmitted by the physical information terminal 50 is not limited one. For example, the physical information may be a plurality of pieces of physical information such as iris information and location information. By setting the plurality of pieces of physical information, it becomes more reliable to specify the user.

As illustrated in FIG. 1, the image processing apparatus 10 includes a job obtaining unit 12, a job managing unit 14, a job receiving unit 16, a job executing unit 18, a physical information terminal communicating unit 20, and a physical information terminal approach detecting unit 22.

The physical information terminal communicating unit 20 includes an antenna 24 and receives the physical information mostly transmitted from the physical information terminal 50. The physical information received by the physical information terminal communicating unit 20 is not limited to one and may be plural. In a case where the received physical information is plural, it becomes more reliable to specify the user as described above. As an example, communication with the physical information terminal 50 is performed by using a short-range wireless communication method. An example of the short-range wireless communication method used in the present exemplary embodiment is near field communication (NFC), Bluetooth (registered trademark), or the like.

The physical information terminal approach detecting unit 22 detects the approaching user who wears the physical information terminal 50 by communicating with the physical information terminal 50 in the physical information terminal communicating unit 20. For example, the approaching user is detected by using an intensity of a radio field received by the physical information terminal communicating unit 20 from the physical information terminal 50 or by using a signal of a GPS included in each of the physical information terminal communicating unit 20 and the physical information terminals 50. In the present exemplary embodiment, as an example, the approaching user is detected by using the intensity of the radio field received by the physical information terminal communicating unit 20 from the physical information terminal 50. In a case where the approaching user is detected, the physical information terminal approach detecting unit 22 notifies the job obtaining unit 12 of the approach of the user.

The job receiving unit 16 receives additional processing information transmitted from the user terminal 30 via the network 70. As described above, the additional processing information according to the present exemplary embodiment is information obtained by associating information to be processed by the image processing apparatus 10 with the physical information. Hereinafter, in some cases, the additional processing information is referred to as "job". "Job" according to the present exemplary embodiment is a unit of a process executed by the image processing apparatus 10. In the present exemplary embodiment, an image forming process (presswork or print) will be described as an example of the job of the image processing apparatus 10.

The job managing unit 14 is a memory unit which stores a job and the like transmitted from the user terminal 30 and is configured by, for example, a hard disk drive (HDD), a random access memory (RAM), and the like. In some cases, the job managing unit 14 may also store image processing information other than the job transmitted from the user terminal 30, for example, image information or the like read by a scanner. The job managing unit 14 is an example of "storage unit".

In a case of receiving a notification of the approach of the user from the physical information terminal approach detecting unit 22, the job obtaining unit 12 obtains a job which the approaching user transmits to the image processing apparatus 10 via the network 70, from the job managing unit 14 by using the physical information received from the physical information terminal 50. Specifically, the job associated with the physical information which matches the physical information received by the physical information terminal communicating unit 20, is extracted from the job managing unit 14.

The job executing unit 18 executes the job obtained by the job obtaining unit 12. In a case where a predetermined condition is satisfied (for example, case where predetermined approach condition is satisfied) other than the case of executing the job immediately after the user approaches, the job executing unit 18 executes the job obtained by the job obtaining unit 12.

The user terminal 30 generates the job which the user executes in the image processing apparatus 10. Although the aspect of the user terminal 30 is not particularly limited thereto, a personal computer (PC), a personal digital assistant (PDA), a tablet terminal, or the like may be used as an example. In the present exemplary embodiment, it is assumed that the user terminal 30 is a PC as an example. In some cases, for example, the user terminal 30 is plural corresponding to each of the plurality of users or one user terminal 30 is shared by the plurality of users. As illustrated in FIG. 1, the user terminal 30 includes a physical information terminal communicating unit 38 and a physical information terminal registering unit 42 to which a user operating unit 32, a job generating unit 34, a job transmitting unit 36, and an antenna 40 are connected.

The physical information terminal communicating unit 38 communicates with the physical information terminal 50 which the user wears and mostly receives the physical information. As an example, communication with the physical information terminal 50 is performed by using a short-range wireless communication method. An example of the short-range wireless communication method used in the present exemplary embodiment is NFC, Bluetooth (registered trademark), or the like.

The user operating unit 32 includes, for example, a liquid crystal screen, a keyboard, and the like, and is used as an interface in a case where the user generates the job.

The job generating unit 34 generates processing information (print processing information in present exemplary embodiment) based on the instruction input by the user operating the user operating unit 32. In addition, the job generating unit 34 obtains the physical information from the physical information terminal communicating unit 38. In the case of generating the processing information, the job generating unit 34 generates the additional processing information (job) by associating the physical information with the generated processing information.

The job transmitting unit 36 transmits the job generated by the job generating unit 34 to the image processing apparatus 10 via the network 70.

The physical information terminal registering unit 42 registers the user terminal 30 and the physical information terminal 50 in correspondence with each other. For example, in a case where the user terminal 30 is shared by the plurality of users, a plurality of physical information terminals 50 may be registered in one user terminal 30. The physical information of the user is registered in association with each of the physical information terminals 50 registered in the physical information terminal registering unit 42. A timing of registering the physical information terminal 50 in the physical information terminal registering unit 42 may be a timing when the physical information terminal 50 is registered in advance before the user uses the user terminal 30 or may be a timing when the physical information terminal 50 is automatically registered in the case where the user uses the user terminal 30.

Here, in the viewpoint of maintaining security, a confidential process (outputting processing result in state in which no one else knows) is also required in the image processing apparatus. However, in the confidential process of the image processing apparatus in the related art, it is necessary to set, register, and manage authentication information for each of the users. In addition, also in a case where the user executes the confidential process in the image processing apparatus, it is necessary to designate the process via a UI unit or the like of the image processing apparatus in addition to an authentication operation and the execution is very complicated. Accordingly, it is also required in the image processing apparatus that the confidential process is performed with a simpler configuration.

On the other hand, for example, in a case where the user executes a wrong process by simply approaching the image processing apparatus or in a case where the wrong process is executed in a state in which there is another person other than the user near the image processing apparatus, the confidential process is invalid. In the present exemplary embodiment, the user terminal adds the physical information to the job and in a case where the image processing apparatus receives the physical information, the job to which the physical information is added, is executed. Accordingly, it possible to more easily perform the confidential process as compared with using an authentication system.

An additional processing information generating process executed by the user terminal 30 according to the present exemplary embodiment will be described with reference to FIG. 2. FIG. 2 is a flowchart illustrating a flow of the present additional processing information generating process program. The present additional processing information generating process program is stored in, for example, a memory unit such as a read only memory (ROM) (not illustrated) of the user terminal 30 and is developed into a RAM or the like by a central processing unit (CPU) and executed. In the additional processing information generating process illustrated in FIG. 2, the user starts to input a print job executed by the image processing apparatus 10 using the user terminal 30.

In step S100, the physical information terminal communicating unit 38 is controlled to obtain "physical information" which is information for identifying the user (physical information terminal 50). The physical information according to the present exemplary embodiment is not particularly limited thereto as long as the physical information is physi-cal information capable of identifying the user. For example, iris information, fingerprint information, location information of the user, and the like are used. In the present exemplary embodiment, as an example of the physical information of the user, iris information of the user is used. A timing of obtaining the physical information is, for example, a timing when communication between the physical information terminal communicating unit 38 of the user terminal 30 and the physical information terminal 50 is established. After step S100, there may be provided a step in which whether or not the obtained physical information is registered in the physical information terminal registering unit 42 is confirmed. According to the confirming step, it becomes more reliable to check the user.

In step S102, the job generating unit 34 is controlled so as to generate the additional processing information (job) by adding the physical information obtained in step S100 to the print processing information executed by the image processing apparatus 10. Specifically, the physical information is included in page description language (PDL) data generated for the printing process. A timing of adding the physical information to the processing information is, for example, a timing when the user starts to input the processing information generation or a timing which the processing information generation is completed. In the present exemplary embodiment, as an example, a method of directly adding the physical information to the processing information executed by the image processing apparatus 10 is described, but the method is not limited thereto. The processing information and the physical information may be stored in association with each other (in pairs) in a memory unit such as an HDD or the like (not illustrated) of the user terminal 30.

In step S104, the job transmitting unit 36 is controlled so as to transmit the job generated in step S102 to the image processing apparatus 10. As the generation of the job is completed, the job transmitting unit 36 may automatically transmit the job. By displaying an idle screen for the user on the UI unit or the like (not illustrated), the transmission may be performed according to an instruction of the user.

Next, an additional processing information executing process executed by the image processing apparatus 10 according to the present exemplary embodiment will be described with reference to FIG. 3. FIG. 3 is a flowchart illustrating a flow of the present additional processing information executing process. The present additional processing information executing process program is stored in, for example, a memory unit such as a ROM (not illustrated) of the image processing apparatus 10 and is developed into a RAM or the like by a CPU and executed. In the additional processing information executing process illustrated in FIG. 3, it is assumed that the user already transmits the job from the user terminal 30 to the image processing apparatus 10 via the network 70.

In step S200, the physical information terminal approach detecting unit 22 is controlled so as to wait until the physical information terminal 50 (user) approaches. In a case of detecting the approaching physical information terminal 50, the process moves to step S202.

Here, as described above, the approaching user is detected based on the physical information terminal communicating unit 20 communicating with the physical information terminal 50. That is, as an example, the physical information terminal approach detecting unit 22 receives a radio field intensity of a transmission signal transmitted from the physical information terminal 50, from the physical information terminal communicating unit 20 and detects the approach in the case where the radio field intensity is equal to or larger than a predetermined value. The detection is not limited thereto. For example, each of the physical information terminal 50 and the physical information terminal communicating unit 20 includes a GPS function and in a case where a difference between the GPS signal of the physical information terminal 50 and the GPS signal of the physical information terminal communicating unit 20 is equal to or smaller than a predetermined value, the approaching user may be detected.

In step S202, whether or not an approach state is continued (maintained) for a predetermined period (time) or longer is determined. In a case where the determination is positive, it is determined that the user intentionally approaches the image processing apparatus 10 to use the image processing apparatus 10 and the process moves to step S204. On the other hand, in a case where the determination is negative, it is determined that the approach of the user is released and the process returns to step S200 to continue detecting the approach of the physical information terminal 50.

In step S204, whether or not another physical information terminal 50 (user) approaches is determined. In the same manner as step S200, the physical information terminal approach detecting unit 22 receives a radio field intensity of a transmission signal transmitted from the physical information terminal 50, from the physical information terminal communicating unit 20 and executes the determination. In a case where the determination is positive, the process moves to step S200. That is, in a case where the plurality of approaching users are detected, the user who uses the image processing apparatus 10 is not specified and the physical information is not obtained. This is because the job to be executed in the image processing is a job of any one of the users, but since the plurality of physical information terminals 50 are detected, the user of the job to be processed is not specified. In addition, for example, this is because there is a possibility that in a case where the job of the first approaching user is executed, print contents is visually recognized by the user who is not related to the job. That is, the confidential process of the job is damaged.

In step S206, the physical information terminal communicating unit 20 is controlled so as to obtain the physical information from the approaching physical information terminal 50.

In step S208, the job managing unit 14 is controlled so as to determine whether or not the job (additional processing information) to which the physical information which matches the physical information obtained in step S206 is added, exists in the job managing unit 14. In a case where the determination is negative, the process returns to step S200 to continue detecting the approach of the physical information terminal 50. In a case where the determination is positive, the process moves to step S210.

In step S210, the job obtaining unit 12 is controlled so as to obtain whether or not the job (additional processing information) to which the physical information which matches the physical information obtained in step S206 is added, from the job managing unit 14.

In step S212, the job managing unit 14 is controlled so as to determine whether or not a predetermined period (time) elapses since the job (additional processing information) is stored in the job managing unit 14. In a case where the determination is positive, the process returns to step S200, that is, the job is not executed. For example, in a case where the physical information terminal 50 and the user terminal 30 are shared by the plurality of users, further in a case where the predetermined period elapses since the job is stored in the job managing unit 14, it is apprehended that a correspondence between the user and the job may be ambiguous. In addition, the amount of storage in the job managing unit 14 of the image processing apparatus 10 is suppressed from exceeding a certain scale. On the other hand, in a case where the determination is negative, the process moves to step S214.

In step S214, the printing process which is a process corresponding to the processing information included in the job (additional processing information), is executed. At this time, the executable job may be displayed on the UI unit or the like (not illustrated) of the image processing apparatus 10 and the image processing apparatus 10 waits for an instruction to start execution from the user.

In step S216, in a case where it is determined that an end instruction exists and the determination is negative, the process returns to step S200 to continue detecting the approach of the physical information terminal 50. In a case where the determination is positive, the present additional processing information executing process program is ended. The end instruction in step S216 is, for example, a case where a power of the image processing apparatus 10 is turned off.

In the present exemplary embodiment, the embodiment in which the physical information terminal 50 and the user terminal 30 are separated is described, but the embodiment is not limited thereto and the physical information terminal 50 and the user terminal 30 may be integrated. For example, in a case where the user terminal 30 is a terminal which the user carries such as a tablet terminal or the like, the physical information terminal 50 and the user terminal 30 are shared with each other. That is, the physical information of the user is stored in a memory unit (not illustrated) of the user terminal 30. In a case where the user terminal 30 transmits the job, the physical information is read from the memory unit and associated with the processing information. In the case where the user carries the user terminal 30 and approaches the image processing apparatus 10, the job may be executed.

In addition, each of the processes executed by the user terminal 30 and the image processing apparatus 10 according to each of the present exemplary embodiments described above may be recorded and distributed in a memory section as a program to be executed by a computer.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising:
   a storage unit that stores additional processing information which is processing information associated with physical information of a physical information terminal which a user wears, the additional processing information being transmitted from a user terminal that receives the physical information from the physical information terminal and in a case where the physical information is received, generates the processing information for executing a process for image processing required by the user according to an instruction from the user; and a first processor, configured to:

receive the physical information from the physical information terminal; and in a case where the received physical information matches the physical information of the additional processing information stored in the storage unit, execute the process corresponding to the processing information included in the additional processing information.

2. The image processing apparatus according to claim 1, wherein the first processor detects approach of the user, the first processor, in a case where the approach of the user is detected, receives the physical information from the physical information terminal.

3. The image processing apparatus according to claim 2, wherein the first processor, in a case where a distance between the physical information terminal and the image processing apparatus is shorter than a predetermined distance, detects the approach.

4. The image processing apparatus according to claim 3, wherein the first processor obtains the distance between the physical information terminal and the image processing apparatus by using a communication signal of the first processor with the physical information terminal.

5. The image processing apparatus according to claim 4, wherein the first processor, in a case of detecting that approach of the user continues for a predetermined period, receives the physical information from the physical information terminal.

6. The image processing apparatus according to claim 5, wherein the first processor, in a case of detecting approach of a plurality of the users, does not receive the physical information from any of the physical information terminals.

7. The image processing apparatus according to claim 4, wherein the first processor, in a case of detecting approach of a plurality of the users, does not receive the physical information from any of the physical information terminals.

8. The image processing apparatus according to claim 3, wherein the first processor, in a case of detecting that approach of the user continues for a predetermined period, receives the physical information from the physical information terminal.

9. The image processing apparatus according to claim 8, wherein the first processor, in a case of detecting approach of a plurality of the users, does not receive the physical information from any of the physical information terminals.

10. The image processing apparatus according to claim 3, wherein the first processor, in a case of detecting approach of a plurality of the users, does not receive the physical information from any of the physical information terminals.

11. The image processing apparatus according to claim 2, wherein the first processor, in a case of detecting that approach of the user continues for a predetermined period, receives the physical information from the physical information terminal.

12. The image processing apparatus according to claim 11, wherein the first processor, in a case of detecting approach of a plurality of the users, does not receive the physical information from any of the physical information terminals.

13. The image processing apparatus according to claim 2, wherein the first processor, in a case of detecting approach of a plurality of the users, does not receive the physical information from any of the physical information terminals.

14. The image processing apparatus according to claim 1, wherein the first processor, in a case where a predetermined period elapses since the additional processing information is stored in the storage unit, does not execute the process corresponding to the processing information included in the additional processing information.

15. The image processing apparatus according to claim 1, wherein the physical information is at least one of iris information, fingerprint information, or location information of the user.

16. The image processing apparatus according to claim 1, further comprising:

a display unit that displays information on the execution of the processing information, wherein the first processor, when executing the process corresponding to the processing information, causes the display unit to display an image for prompting confirmation of a start of the process.

17. An image processing system comprising:

the image processing apparatus according to claim 1;

a physical information terminal that a user wears and includes an antenna which transmits physical information of the user; and a user terminal that includes a second processor, configured to:

receive the physical information from the physical information terminal, generate processing information for executing a process for image processing required by the user according to an instruction from the user, in a case where the physical information is received, generate additional processing information in which the physical information is associated with the processing information, and transmit the additional processing information to the image processing apparatus, wherein the image processing apparatus executes the process corresponding to the processing information included in the additional processing information after receiving the additional processing information.

18. The image processing system according to claim 17, wherein the second processor registers the user terminal and the physical information terminal in correspondence with each other, and wherein the second processor, in a case where the physical information terminal that transmits the physical information received by the second processor is registered, generates the additional processing information.

19. The image processing system according to claim 17, wherein the user terminal further includes a memory unit, and wherein the second processor stores the processing information and the physical information in pairs in the memory unit and generates the additional processing information by reading the processing information and the physical information in pairs from the memory unit when generating the additional processing information.

20. The image processing system according to claim 17, wherein the physical information terminal and the user terminal are integrally configured.

\* \* \* \* \*